United States Patent [19]
Vance et al.

[11] Patent Number: 6,106,959
[45] Date of Patent: Aug. 22, 2000

[54] MULTILAYER THERMAL BARRIER COATING SYSTEMS

[75] Inventors: Steven J. Vance, Orlando; John G. Goedjen, Oviedo; Stephen M. Sabol, Orlando; Kelly M. Sloan, Longwood, all of Fla.

[73] Assignee: Siemens Westinghouse Power Corporation, Orlando, Fla.

[21] Appl. No.: 09/273,383

[22] Filed: Mar. 22, 1999

Related U.S. Application Data

[63] Continuation-in-part of application No. 09/132,366, Aug. 11, 1998, abandoned.

[51] Int. Cl.[7] .......................... B32B 15/01; B32B 15/04; B32B 15/20; B21D 53/78
[52] U.S. Cl. .......................... 428/623; 428/633; 428/678; 428/667; 428/680; 428/651; 416/241 B
[58] Field of Search .......................... 416/241 R, 241 B; 428/548, 550, 552, 615, 622, 632, 633, 650, 654, 652, 678, 668, 623, 667, 680, 220, 629, 689, 688, 697, 699, 701, 702, 547, 613, 651

[56] References Cited

U.S. PATENT DOCUMENTS

| | | | |
|---|---|---|---|
| 4,255,495 | 3/1981 | Levine et al. | 428/632 |
| 4,269,903 | 5/1981 | Clingman et al. | 428/591 |
| 4,321,310 | 3/1982 | Ulion et al. | 428/612 |
| 4,321,311 | 3/1982 | Strangman | 428/623 |
| 4,588,607 | 5/1986 | Matarese et al. | 427/34 |
| 5,302,465 | 4/1994 | Miller et al. | 428/552 |
| 5,352,540 | 10/1994 | Schienle et al. | 428/623 |
| 5,562,998 | 10/1996 | Strangman | 428/612 |
| 5,624,721 | 4/1997 | Strangman | 427/585 |
| 5,630,314 | 5/1997 | Kojima et al. | 60/39.182 |
| 5,652,044 | 7/1997 | Rickerby | 428/216 |
| 5,683,825 | 11/1997 | Bruce et al. | 428/698 |
| 5,687,679 | 11/1997 | Mullin et al. | 123/41.79 |
| 5,705,231 | 1/1998 | Nissley et al. | 427/453 |
| 5,773,141 | 6/1998 | Hasz et al. | 428/335 |
| 5,780,171 | 7/1998 | Nissley et al. | 428/629 |
| 5,780,178 | 7/1998 | Jones | 428/697 |
| 5,792,521 | 8/1998 | Wortman | 427/567 |
| 5,830,586 | 11/1998 | Gray et al. | 428/621 |
| 5,863,668 | 1/1999 | Brindley et al. | 428/612 |
| 5,876,860 | 3/1999 | Marijnissen et al. | 428/623 |
| 5,912,087 | 6/1999 | Jackson et al. | 428/610 |

FOREIGN PATENT DOCUMENTS

| | | |
|---|---|---|
| 0 366 924 A2 | 5/1990 | European Pat. Off. . |
| 0 705 912 A2 | 3/1992 | European Pat. Off. . |
| 0 605 196 A1 | 7/1994 | European Pat. Off. . |
| WO 97/01436 | 1/1997 | WIPO . |

OTHER PUBLICATIONS

Padture et al., "Low Thermal Conductivity in Garnets", J. Am. Ceram. Soc., vol. 80, pp. 1018–1020, Apr. 1997.
"Low Thermal Conductivity in Garnets"; J.Am.Ceram.Soc., 80[4]1018–20 (1997); Padture et al., (Apr.).
Padture, Nitin P. and Paul G. Klemens, "Low Thermal Conductivity in Garnets", Journal of the American Ceramics Society, Apr. 1997, pp. 1018–1020, vol. 80, No. 4, American Ceramics Society, Westerville, Ohio, U.S.A.

Primary Examiner—Deborah Jones
Assistant Examiner—Michael LaVilla
Attorney, Agent, or Firm—Eckert Seamans Cherin & Mellot, LLC

[57] ABSTRACT

The present invention generally describes multilayer thermal barrier coating systems and methods of making the multilayer thermal barrier coating systems. The thermal barrier coating systems comprise a first ceramic layer, a second ceramic layer, a thermally grown oxide layer, a metallic bond coating layer and a substrate. The thermal barrier coating systems have improved high temperature thermal and chemical stability for use in gas turbine applications.

10 Claims, 1 Drawing Sheet

MULTILAYER THERMAL BARRIER COATING SYSTEMS

CROSS-REFERENCE TO RELATED APPLICATION

This application is a continuation-in-part application of Ser. No. 09/132,366, filed on Aug. 11, 1998, now abandoned.

GOVERNMENT CONTRACT

The Government of the United States of America has rights in the invention pursuant to Contract DE-FC21-95MC32267, awarded by the United States Department of Energy.

FIELD OF THE INVENTION

The present invention generally describes multilayer thermal barrier coating systems and methods of making them. The thermal barrier coating systems comprise a first ceramic layer, a second ceramic layer, a thermally grown oxide layer, a metallic bond coating layer and a substrate. The thermal barrier coating systems have improved high temperature thermal and chemical stability for use in gas turbine applications.

BACKGROUND OF THE INVENTION

In gas turbine applications, a single layer of partially yttria stabilized zirconia (YSZ) is typically deposited by electron beam-physical vapor deposition (EB-PVD) or air plasma spray (APS) techniques onto a metallic bond coating or substrate to act as a ceramic thermal barrier coating. When the YSZ is applied by EB-PVD, a columnar grained microstructure is obtained, where the columns, with minute spaces between them are oriented substantially perpendicular to the surface of the metallic bond coating which covers the metal substrate, as is well known in the art. Between individual columns of the EB-PVD coating are micron spaced gaps extending from the outer surface of the YSZ layer to within a few micrometers of the bond coating or its associated alumina layer, as described in U.S. Pat. No. 5,562,998 (Strangman). This $ZrO_2$ columnar structure is also described in U.S. Pat. No. 4,321,311 (Strangman) where such columnar layer is about 100–175 micrometers (0.004–0.007 inch) thick, and where the cracks or gap openings between individual columns are in the sub-micron to one micron range.

The structure of the YSZ evolves during service at high temperatures. Sintering and/or transformation of the crystal structure leads to failure during thermal-elastic cycling. Loss of and/or segregation of yttrium at high temperatures can cause destabilization of the cubic-YSZ and tetragonal-YSZ structures. As a result, the ceramic structure transforms to monoclinic-zirconia on cooling. The volume change that results from the transformation to monoclinic-zirconia leads to spallation of the ceramic coating. Because of the ceramic failure mechanisms, it is critical to limit the maximum service temperature of the thermal barrier ceramic coating. The temperature of the thermal barrier ceramic (e.g., YSZ) can be limited by controlling the temperatures of the combustion process. However, increased turbine efficiency requires increased combustion temperatures.

Besides high temperature mechanical properties, excellent phase/thermal stability and high thermal expansion coefficients are desirable for thermal barrier coatings. Padture et al., in *J. Am. Ceram. Soc, "Low Thermal Conductivity in Garnets"*, 80[4] 118–120, (1997) have suggested that polycrystalline garnets may be very useful in this regard, in advanced thermal barrier coatings, as a complete substitution for stabilized zirconia.

There is however still a need for new systems and methods of controlling temperatures in thermal barrier coating systems. The present invention is directed to these, as well as other, important ends and it is one of the main objects of this invention to provide such thermal barrier coating systems.

SUMMARY OF THE INVENTION

The present invention generally describes multilayer thermal barrier coating systems comprising a first ceramic layer, a second ceramic layer, a metallic bond coating layer and a substrate. If desired, the thermal barrier coating system may also comprise a third ceramic layer disposed between the first ceramic layer and the second ceramic layer. Upon heat treatment during manufacture and/or service, the thermal barrier coating system will also form a thermally grown oxide layer between the second ceramic layer and the metallic bond coating layer.

The present invention also describes methods of making multilayer thermal barrier coating systems comprising depositing a metallic bond coating layer onto a substrate; depositing a second ceramic layer onto the metallic bond coating layer; and depositing a first ceramic layer onto the second ceramic layer. If desired, the methods may further comprise depositing a third ceramic layer onto the second ceramic layer, such that the first ceramic layer will be deposited onto the third ceramic layer. The methods also comprise heat treating the thermal barrier coating system to produce a thermally grown oxide layer between the second ceramic layer and the metallic bond coating layer.

The present invention also describes methods of making thermal barrier coating systems comprising depositing a metallic bond coating layer onto a substrate; depositing a second ceramic layer having a columnar structure with microgaps between the columns in the structure; and depositing a first ceramic layer also having a columnar structure onto the second ceramic layer, where the columns of the first ceramic layer grow on top of and are a continuation of the columns of the second ceramic layer.

These and other aspects of the present invention will become clearer from the following detailed description.

DETAILED DESCRIPTION OF THE PREFERRED EMBODIMENTS

Figure 1:
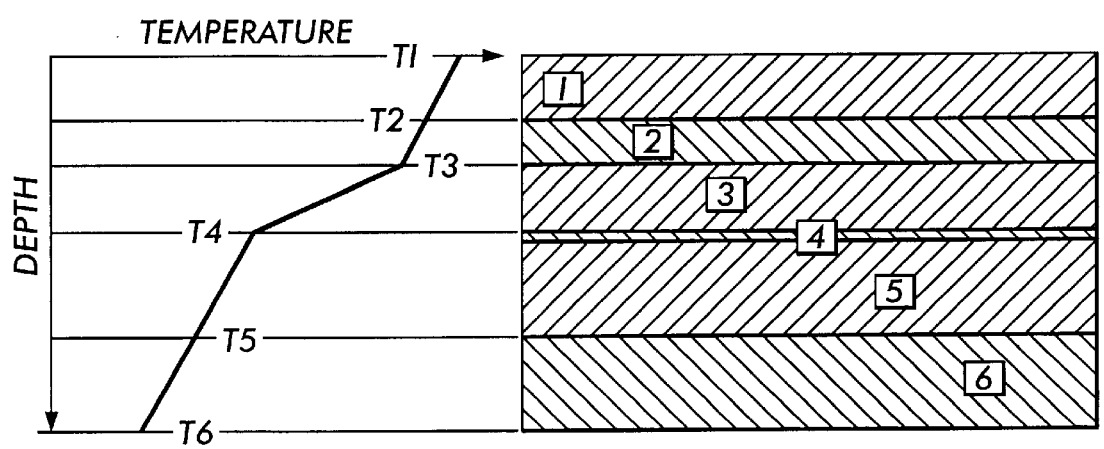
FIG. 1 is a temperature profile and cross-sectional view of a multilayer ceramic thermal barrier coating system of the present invention.

The present invention generally describes multilayer ceramic thermal barrier coating systems for improved high temperature thermal-chemical stability in hot section in turbine applications. The combination of one or more ceramic layers, that are stable at increasingly high temperatures, with a low thermal conductivity ceramic, results in a ceramic thermal barrier coating system that has improved thermal-chemical stability, as well as acceptable thermal conductivity, when compared to YSZ thermal barrier coatings. Use of the multiple ceramic layer with a metallic bond coating will result in a thermal barrier coating system that has increased life durability for high temperature oxidizing environments.

The additional ceramic layers limit the service temperature of the highly insulating thermal barrier ceramic coating (for example, YSZ). In one embodiment of this invention, ceramic material switch higher thermal stability (for example, stabilized hafnia or compounds with a garnet crystal structure) can be used as outer coating layers to provide an additional thermal barrier that will help protect the inner ceramic layer. In a preferred embodiment of this invention, the inner ceramic layer is commercial yttria stabilized zirconia, with a layer of scandia stabilized zirconia on the surface for improved resistance to hot corrosion of the TBC, which can occur, for example, in the presence of a dirty fuel environment.

FIG. 1 is a schematic of a thermal barrier coating system of the present invention that comprises multiple ceramic layers, and the corresponding temperature profile for each layer.

Layer 1 is a ceramic layer, for example, hafnia or scandia stabilized zirconia, or yttrium aluminum garnet ("YAG"-$Y_3Al_5O_{12}$) that is more stable at high temperatures than a typical thermal barrier ceramic (for example, YSZ). This layer provides a drop in temperature across its thickness from T1 (the surface temperature of the component) to T2 (the temperature at the first interface). Layer 1 is applied by thermal spray process such as air plasma spray (APS) or by electron beam physical vapor deposition (EB-PVD). Both of these methods are currently used commercially for applying ceramic thermal barrier coatings.

Currently, ceramic coatings are applied in the range of 125 to 500 micrometers (5 to 20 mils) thick for thermal barrier applications. Some more recent applications, however, have required thermal barrier coatings up to 1000 micrometers 940) mils thick. Within the scope of this invention, the thickness of the ceramic layers may vary from at least about 50 micrometers (2 mils) up to the thickness of the thermal barriers coating. In the preferred embodiment, however, the thermal conductivity of each individual layer should be less than 4 w/mK.

Layer 2 is an optional layer that is composed of an additional ceramic or series of ceramics. In one embodiment of this invention, this inner layer or series of inner layers is primarily comprised of commercial yttria stabilized zirconia. Layer 2 provides an additional thermal drop to T3, but is primarily intended to improve the chemical stability and adherence between the outer and inner ceramic layers (that is layers 1 and 3). Layer 2 is also applied by thermal spray process such as air plasma spray (APS) or be electron beam physical vapor deposition (EB-PVD). Both of these methods are currently used commercially for applying ceramic thermal barrier coatings.

Layer 3 is a ceramic with very low thermal conductivity and provides primary thermal protection of the substrate alloys. The maximum temperature (T3) for layer 3 is kept below the maximum safe operating temperature for the material by the outer ceramic layers. In the preferred embodiment, layer 3 is yttria stabilized zirconia.

Layer 3 is also applied by thermal spray process such as air plasma spray (APS) or by electron beam physical vapor deposition (EB-PVD). Both of these methods are currently used commercially for applying ceramic thermal barrier coatings.

As embodied here there are two or three ceramic layers. In the preferred embodiment, each layer is of a different chemistry such that there is a functional trade off between thermal properties and high temperature stability. In the preferred embodiment the ceramic layers closest to the gas path temperature of up to 1649° C. (3000° F.) are selected based on their stability at high temperatures whereas the inner ceramic layers are selected based on their low thermally conductive properties, that is, they are good insulators.

In addition to having two or three layers of ceramics, it is also within the scope of this invention to continuously grade the ceramic coating from one composition to another. According to the teachings of this invention, each layer would be a different composition based on its distance from the gas path temperature and may be distinct or graded between chemistries as described above. The purpose of this embodiment of the invention is to increase hot corrosion resistance and to increase the thermal barrier coating (TBC) temperature stability.

In one preferred embodiment, a layer 3 of yttria stabilized zirconia serves as a nucleation site/layer for a polycrystalline garnet material, such as yttrium aluminum garnet as layer 1, where optional layer 2 is not present, and where both layers 1 and 3 have a columnar structure. Here, the material of layer 1 is a continuation of the columnar structure of layer 2 so that the interface would appear to be without substantial gaps. This occurs by use of electron beam physical vapor deposition. The layer 2 would also have a coefficient of thermal expansion between the ceramic YAG of layer 1 and the metal substrate of layer 6, the turbine super alloy, so that upon thermal cycling or heating and cooling there will be minimal stress between the two layers, substantially contributing to crack resistance.

Layer 4 is a thermally grown oxide (TGO) layer that develops during heat treatments and service. This layer forms during both processing and service and may grow from 0 up to 15 micrometers thick through the life of the coating. The layer provides oxidation resistance for the alloys and provides a bond between the ceramic layers and the metallic body coat. The thermally grown oxide layer provides a negligible thermal drop. Layer 4 is comprised substantially of aluminum oxide.

Layer 5 is a metallic bond coating layer that provides oxidation resistance and improved adhesion for the thermal barrier coating. From this layer, aluminum is supplied at the surface to form the TGO layer (layer 4). The bond coat chemistry can be any one of many commercially available MCRA1Y type coatings or modifications thereof where M is nickel, cobalt, or a combination thereof. Layer 5 is applied by any one of a number of thermal spray processes including low pressure plasma spray (LPPS), air plasma spray (APS), and high velocity oxy-fuel (HVOF). This layer is typically 75–200 micrometers (3–8 mils) thick. The operating temperature range for this layer varies. It is preferred that the temperature of layer 5 is restricted to below 955° C. (1750° F.) for long term applications, however, this layer may experience temperature up to 1205° C. (2200° F.) for shorter applications.

Layer 6 is the structural alloy (turbine component) that is protected. Chemical compositions for layer 6 can be any cobalt or nickel based superalloy. An example of a commercially available alloy is IN738 made by Inco Alloys International, Inc.

In the present invention, several advantages result from multiple ceramic layers. First, YSZ can be deposited onto a metallic bond coating. A number of optimizations to this procedure have been made, and the result is an adherent ceramic layer with very low thermal conductivity and good mechanical compliance. Second, additional ceramic layers that have acceptable thermal stability at increased temperatures can be added to protect the YSZ. The second layer can have a higher thermal conductivity than is typically desired for a thermal barrier ceramic, because the YSZ underlay will insulate the metallic bond coating and alloy.

The multilayer thermal barrier coating systems of the present invention exhibit improved high temperature and chemical stability for use in gas turbine applications. Typical gas turbine components to which this invention is directed include turbine blades, vanes, and combustor components made of Co-based or Ni-based superalloy.

The current invention describes a multilayer ceramic thermal barrier coating system for improved high temperature thermal-chemical stability. A natural extension can be made to selecting an outer layer (layer 1) ceramic composition for improved high temperature hot corrosion resistance (that is, scandia stabilized zirconia or yttrium aluminum garnet) or for improved erosion resistance (that is, aluminum oxide). Such modifications are intended to fall within the scope of the appended claims.

Various modifications or the invention in addition to those shown and described herein will be apparent to one skilled in the art from the foregoing description. Such modifications are also intended to fall within the scope of the appended claims.

What is claimed is:

1. A multilayer thermal barrier coating system comprising a first ceramic layer, a second ceramic layer, a metallic bond coating layer and a substrate, wherein the metallic bond coating layer comprises a MCrAlY where M is at least one of nickel, cobalt, or a combination thereof, the first ceramic layer is selected from the group consisting of hafnia stabilized zirconia, scandia stabilized zirconia and compounds that have a garnet crystal structure, the second ceramic layer consists essentially of yttria stabilized zirconia, and the first and second ceramic layer have a columnar structure.

2. The thermal barrier coating system of claim 1, wherein the first ceramic layer comprises scandia stabilized zirconia.

3. The thermal barrier coating system of claim 1, wherein the second coating layer consists of yttria stabilized zirconia.

4. The thermal barrier coating system of claim 1, wherein the substrate comprises a nickel or cobalt superalloy.

5. The thermal barrier coating system of claim 1, further comprising a third ceramic layer disposed between the first ceramic layer and the second ceramic layer.

6. The thermal barrier coating system of claim 5, wherein the third ceramic layer comprises yttria stabilized zirconia.

7. The thermal barrier coating system of claim 1, further comprising a thermally grown oxide layer disposed between the second ceramic layer and the metallic bond coat layer.

8. The thermal barrier coating system of claim 7, wherein the thermally grown oxide layer comprises aluminum oxide.

9. The thermal barrier coating system of claim 1, wherein the first ceramic layer consists of: columnar yttria aluminum garnet and the second ceramic layer consists of columnar yttria stabilized zirconia, where the second ceramic layer has a coefficient of thermal expansion intermediate between the first ceramic layer and the substrate, and the columns of the first ceramic layer grow on top of and are a continuation of the columns of the second ceramic layer so that the interface between the two columnar layers is without substantial gaps.

10. The thermal barrier coating system of claim 1, wherein the first ceramic layer is the top layer and consists of columnar yttria aluminum garnet and is next to the second ceramic layer which is an inner layer which consists of columnar yttria stabilized zirconia, where the second ceramic layer serves as a nucleation site for the first ceramic layer and has a coefficient of thermal expansion intermediate between the first ceramic layer and the substrate so that upon thermal cycling there will be minimal stress between the first ceramic layer and the substrate, and the columns of the first ceramic layer grow on top of and are a continuation of the columns of the second ceramic layer so that the interface between the two columnar layers is without substantial gaps, and where the thermal conductivity of each individual layer is less than 4 w/mk.

\* \* \* \* \*